United States Patent
Carroll et al.

(10) Patent No.: US 11,113,571 B2
(45) Date of Patent: Sep. 7, 2021

(54) TARGET OBJECT POSITION PREDICTION AND MOTION TRACKING

(71) Applicant: Kognition LLC, Philadelphia, PA (US)

(72) Inventors: James Carroll, Philadelphia, PA (US); Michael Grinshpon, Philadelphia, PA (US)

(73) Assignee: Kognition LLC, Philadelphia, PA (US)

( * ) Notice: Subject to any disclaimer, the term of this patent is extended or adjusted under 35 U.S.C. 154(b) by 118 days.

(21) Appl. No.: 16/599,513

(22) Filed: Oct. 11, 2019

(65) Prior Publication Data

US 2020/0117952 A1    Apr. 16, 2020

Related U.S. Application Data

(60) Provisional application No. 62/744,605, filed on Oct. 11, 2018.

(51) Int. Cl.
  *G06K 9/62* (2006.01)
  *G06K 9/46* (2006.01)
  *G06K 9/00* (2006.01)
  *G06N 20/00* (2019.01)

(52) U.S. Cl.
  CPC ....... *G06K 9/6256* (2013.01); *G06K 9/00369* (2013.01); *G06K 9/4628* (2013.01); *G06K 9/6262* (2013.01); *G06K 9/6267* (2013.01); *G06N 20/00* (2019.01)

(58) Field of Classification Search
  CPC .. G06K 9/6256; G06K 9/6267; G06K 9/4628; G06K 9/00369; G06K 9/6262; G06N 20/00

USPC ........................................................ 382/159
See application file for complete search history.

(56) References Cited

U.S. PATENT DOCUMENTS

2006/0110046 A1* 5/2006 Luo ..................... G06K 9/6204
                                                                382/203
2009/0244309 A1* 10/2009 Maison ................... A63F 13/06
                                                                348/222.1

FOREIGN PATENT DOCUMENTS

CN          106874964 A   *  6/2017

* cited by examiner

*Primary Examiner* — Ayodeji O Ayotunde
(74) *Attorney, Agent, or Firm* — Troutman Pepper Hamilton Sanders LLP

(57) ABSTRACT

A computer-implemented method for target object position prediction includes receiving, via an RGB camera a plurality of images depicting one or more persons positioned on a floor. A plurality of person location labels is assigned to each image indicating where the one or more persons are located relative to the floor. A foot position (FP) classifier is trained to classify the images into the person location labels, wherein the FP classifier is configured according to a multi-layer architecture and the training results in determination of a plurality of weights for connecting layers in the multi-layer architecture. A deployment of the FP classifier is created based on the multi-layer architecture, the plurality of weights, and the plurality of person location labels.

20 Claims, 6 Drawing Sheets

TARGET OBJECT POSITION PREDICTION AND MOTION TRACKING

CROSS REFERENCE TO RELATED APPLICATIONS

This application claims the benefit of priority of U.S. Provisional Patent Application Ser. No. 62/744,605, filed on Oct. 11, 2018, entitled "Target Object Position Prediction and Motion Tracking," the entire contents of which are hereby incorporated herein.

FIELD OF THE INVENTION

The present invention relates generally to techniques for providing surveillance in residential and commercial settings. More particularly, the present invention is directed to a system and method that predicts the position and distance of partially occluded persons using a single red/green/blue (RGB) camera.

BACKGROUND OF THE INVENTION

Various image processing and analysis techniques are known in the art for tracking the location or position of target objects within predefined geographical areas. Generally, a number of cameras and sensors are deployed in desired areas to detect a presence of target objects and various servers or mobile edge computing (MEC) which can map the target objects relative to the predefined geographical areas. Thus, existing techniques for tracking and positioning target objects during surveillance can be resource-intensive and cost prohibitive.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In various embodiments, techniques disclosed herein include identifying and calculating body part key points of a person included in an input image and predicting a position of the person's feet using the image and the calculated body part key points. Using the position of the person's feet, the techniques disclosed herein further include positioning the person in a predefined space. In various embodiments, one or more computing devices comprising deep neural networks can be used for implementing various algorithms to predict locations of target objects and subsequent movements of the same. Additionally, the devices can be scaled up or down in accordance with the demand to track more than one target object concurrently.

According to some embodiments, a computer-implemented method for target object position prediction includes receiving, via an RGB camera a plurality of images depicting one or more persons positioned on a floor. A plurality of person location labels is assigned to each image indicating where the one or more persons are located relative to the floor. A foot position (FP) classifier is trained to classify the images into the person location labels, wherein the FP classifier is configured according to a multi-layer architecture and the training results in determination of a plurality of weights for connecting layers in the multi-layer architecture. A deployment of the FP classifier is created based on the multi-layer architecture, the plurality of weights, and the plurality of person location labels.

According to another aspect of the present invention, a computer-implemented method for target object position prediction includes receiving, via an RGB camera, a plurality of images depicting a person positioned on a floor. A trained pose estimation (PE) model is applied to the images to determine a plurality of keypoints associated with the person. The person's location relative to the floor is determined by applying a trained foot position (FP) classifier to inputs comprising the keypoints and coordinates specifying a location of the RGB camera. A visualization of each person's location relative to the floor is then provided on one or more displays.

According to other embodiments, a system for target object position prediction comprises a PE model, a trained FP classifier, and a visualization model. The PE model is trained to determine a plurality of keypoints associated with a person using images acquired with an RGB camera. The FP classifier is trained to determine the person's location relative to a floor in the images based on the keypoints and coordinates specifying a location of the RGB camera. The visualization model is configured to provide a visualization of the person's location relative to the floor on one or more displays.

Additional features and advantages of the invention will be made apparent from the following detailed description of illustrative embodiments that proceeds with reference to the accompanying drawings.

DETAILED DESCRIPTION OF THE INVENTION

Embodiments of the present invention address and overcome one or more of the above shortcomings and drawbacks, by providing methods, systems, and apparatuses related to target object position prediction and motion tracking. Briefly, an RGB camera captures a plurality of image frames of people traversing a floor. Camera processing software decodes the image frames. A pose estimation (PE) network uses those decoded frames and places connected keypoints on each person visible in the image frames. A foot positioning (FP) deep neural network places a point in two dimensional (2-D) space tied to each visible set of keypoints corresponding to the predicted location of the center of gravity projected downwards to the floor (i.e., between both feet). Given the predicted foot placement from the FP deep learning model, and knowledge of the camera and its location in the room, one or more algorithms are used to infer where that predicted foot point is on the plane of the floor, thus placing the person in three-dimensional space.

Figure 1:
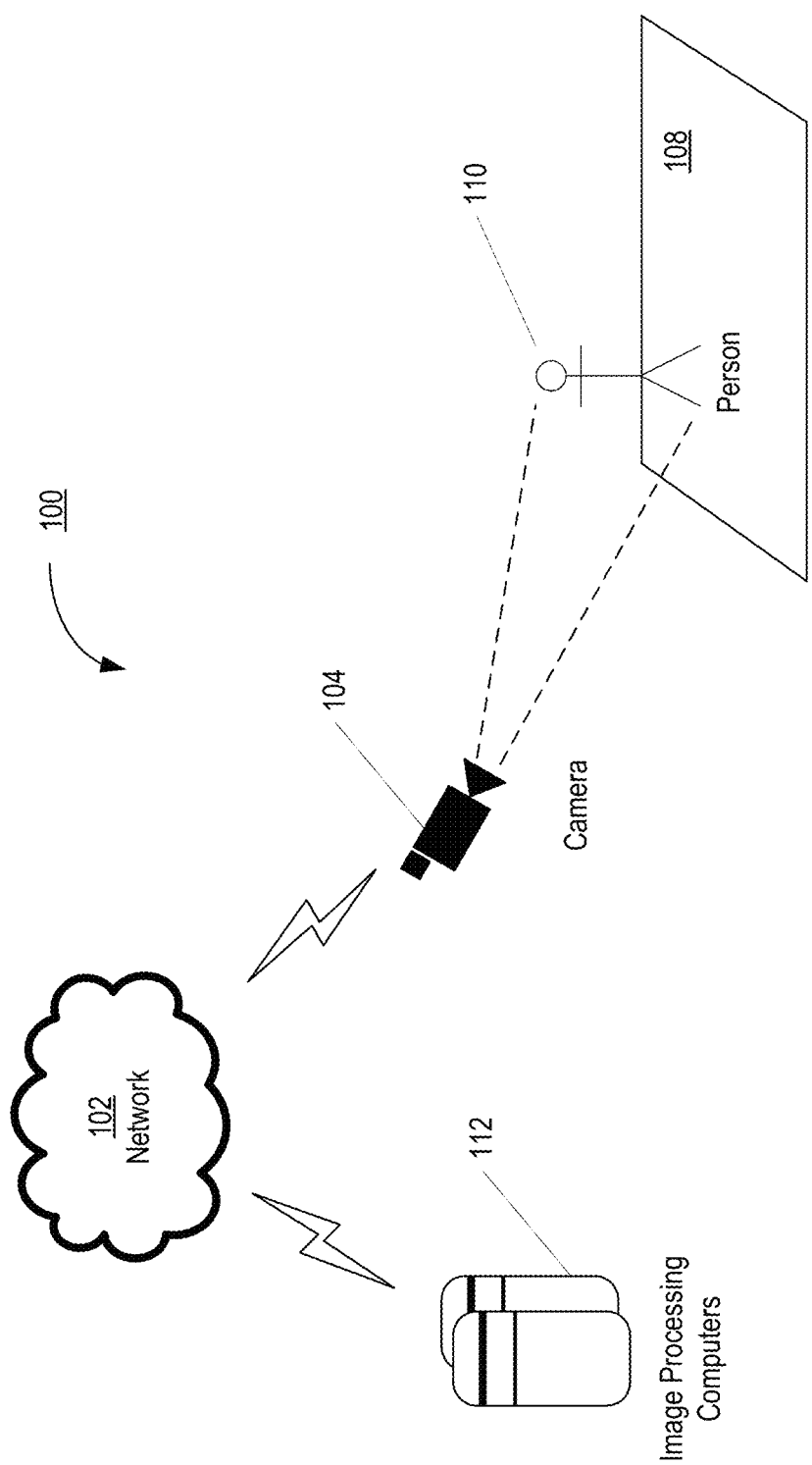
FIG. 1 shows an example network architecture of the present system.

Referring now to FIG. 1, there is shown an example network architecture 100 of the present system. The system comprises at least one camera 104 in a target geographical area 108. A target geographical area can be a single room in a building, an area including multiple rooms (i.e., a group of rooms) that may or may not be adjacent to each other, and/or any dynamic boundary of regular or irregular regions that may or may not correspond to a physical boundary. Moreover, a single area can be across multiple floors in a floor plan. Thus, an area can be arbitrarily defined by a user and/or an administrative entity.

The camera 104 is configured to receive input images within a target geographical area. The input images comprise one or more target object. In the example of FIG. 1, the target object is a person 110. The camera 104 is operatively connected to one or more computing devices 112 connected to a network 102. The computing devices 112 can comprise general purpose computers such as desktops, laptops, computer tablets, and/or other electronic devices that are configured to receive input and generate output. The computing devices can also comprise virtual engines and can be scaled up or down in accordance with demand.

In contrast to conventional systems that require specialized hardware such as RGB-D cameras and multiple synchronized cameras, the techniques described herein use a standard RGB camera to position people. The images acquired by the RGB camera comprise a series of points ranging from 0 to 1 of size LENGTH*WIDTH*DEPTH (L*W*D) where the length is the image length, the width is the image width, and the depth is the red/green/blue (R/G/B) channels of the image. These points are technically a tensor, i.e., an algebraic object that describes a linear mapping from one set of algebraic objects to another. Each R/G/B point extending along the depth is a pixel. Each component of the R/G/B triplet can vary from zero to a pre-defined maximum value. If all components are set to zero, the color of the pixel is black; conversely, if all components are set to a maximum value, the color of the pixel is white. In some embodiments, each component is set to a value between 0 and 1, with fractional values being used to represent intermediate values.

The camera 104 and/or the computing device 112 are configured to determine whether the input images include a target object. Techniques for object detection are generally known in the art, and any such techniques may be used with the techniques described herein. For example, in some embodiments, a You Only Look Once (YOLO) model is used. As would be understood by one skilled in the art, the YOLO model directly predicts bounding boxes and class probabilities for target objects in near real-time. Thus, it is well suited to the task of object detection in live images. It should be noted that objection detection help reduce the downstream processing required to predict the position and distance of the target object (described below). That is, images only need to be processed if they include one or more target objects.

Upon determining that one or more images comprise the person 110, the one or more input images are fed into the PE model. For the purposes of this discussion, it is assumed that the PE model is a convolutional neural network (CNN); however, it should be understood that other types of machine learning models may be used in other embodiments of the present invention. The PE model is a deep learning network trained to place connected keypoints on each visible target object in the images. The body part key points are a set of coordinates that describe the pose of the person 110. For a human object, each keypoint (i.e., coordinate) is a body part. A keypoint is a single point positioned atop a specific body part such as left eye, right shoulder, left knee, base of neck, etc. Keypoints are connected to each other. For example, the left elbow is connected to both the left wrist and the left shoulder. A point on a wrist might be a terminal point (i.e., it has only one connection). Other points (e.g., near the pelvis) might have a plurality of connections (e.g., five or more in some instances).

The calculated body part key points and the original input image are passed to the FP machine learning model. As with the PE model, the FP model is described herein as being implemented with a CNN; however, it should be understood that other types of machine learning models (e.g., probabilistic boosting trees, etc.) may be alternatively used. The FP model is a second deep neural network that that is configured to predict a real-time or near real-time location of the person's 110 feet on a horizontal surface in the target geographical area. Given the location of the person's 110 feet, the second neural network can place the person on the plane of the horizontal surface 108 (e.g., a floor) in relation to the camera's coordinates assuming that the center of gravity as projected downward onto the surface is the person's location (i.e., between both feet). Given the camera coordinates, the second neural network can also calculate world coordinates from the camera to position a person within a space relative to space itself. In various embodiments, the FP model is configured to predict the location of the person's feet so long as a predetermined set of conditions is satisfied. In this way, the FP model can predict the location of the person's feet even if the image of the person is partially obscured. It should be noted that, despite the name, the objective of the FP model is not to predict where feet are positioned, but to predict where a person is relative to the floor. The objective is tracking people on a floor, not their feet. In some embodiments, for internal validation, a matching algorithm is employed to find each predicted foot point from the FP network that most closely matches the person's keypoints from the PE network.

Figure 2:
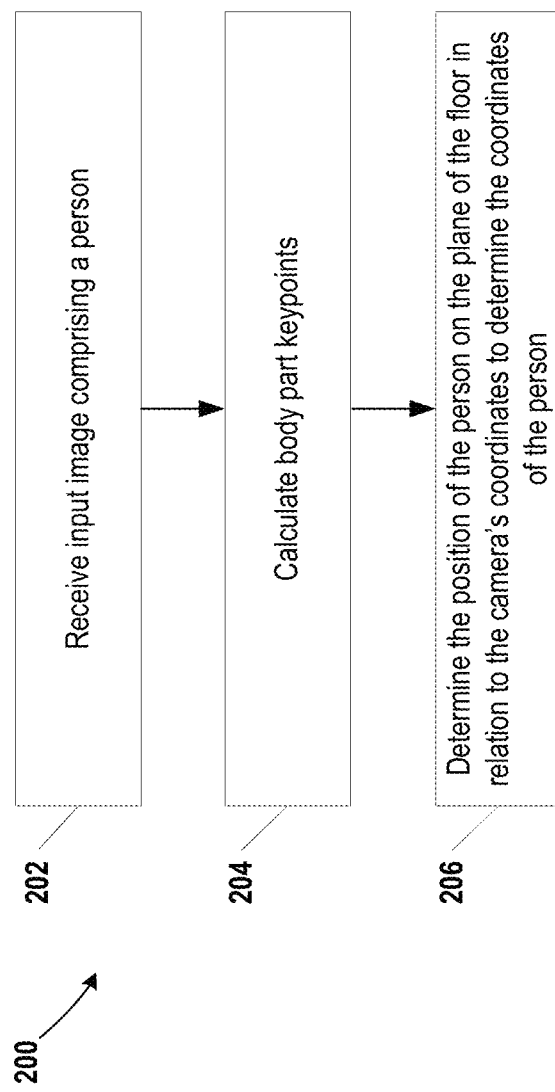
FIG. 2 shows a flow diagram of an example process for determining a real-time or a near real-time position of a target object.

Referring now to FIG. 2, there is shown a flow diagram of an example process 200 for determining a real-time or a near real-time position of a target object. The processes are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the architecture of FIG. 1.

At block 202, a deep neural network (i.e., the PE model) receives an input image comprising a person (i.e., a target object). Upon receiving the input image, the deep neural network calculates body part key points of one or more key body parts as indicated in block 204. Techniques for human pose detection are generally known in the art and, in general, any technique executable by the computing devices or the camera 104 (or a connected computing system) may be employed to determine the human pose information. For example, OpenPose is a human pose estimation library that uses neural networks and deep learning techniques to jointly detect a human body, head, hand, facial, and foot key points. OpenPose can operate in real-time. Thus, the key points can be collected as the target object is observed in the input images.

Returning to FIG. 2, at block 206, a second deep neural network (i.e., the FP model) receives the calculated body part key points and the input image to predict real-time or near real-time position of the person's feet. The FP model determines the position of the person on the plane of the floor in relation to the camera's coordinates to determine the coordinates of the person.

Figure 3A:
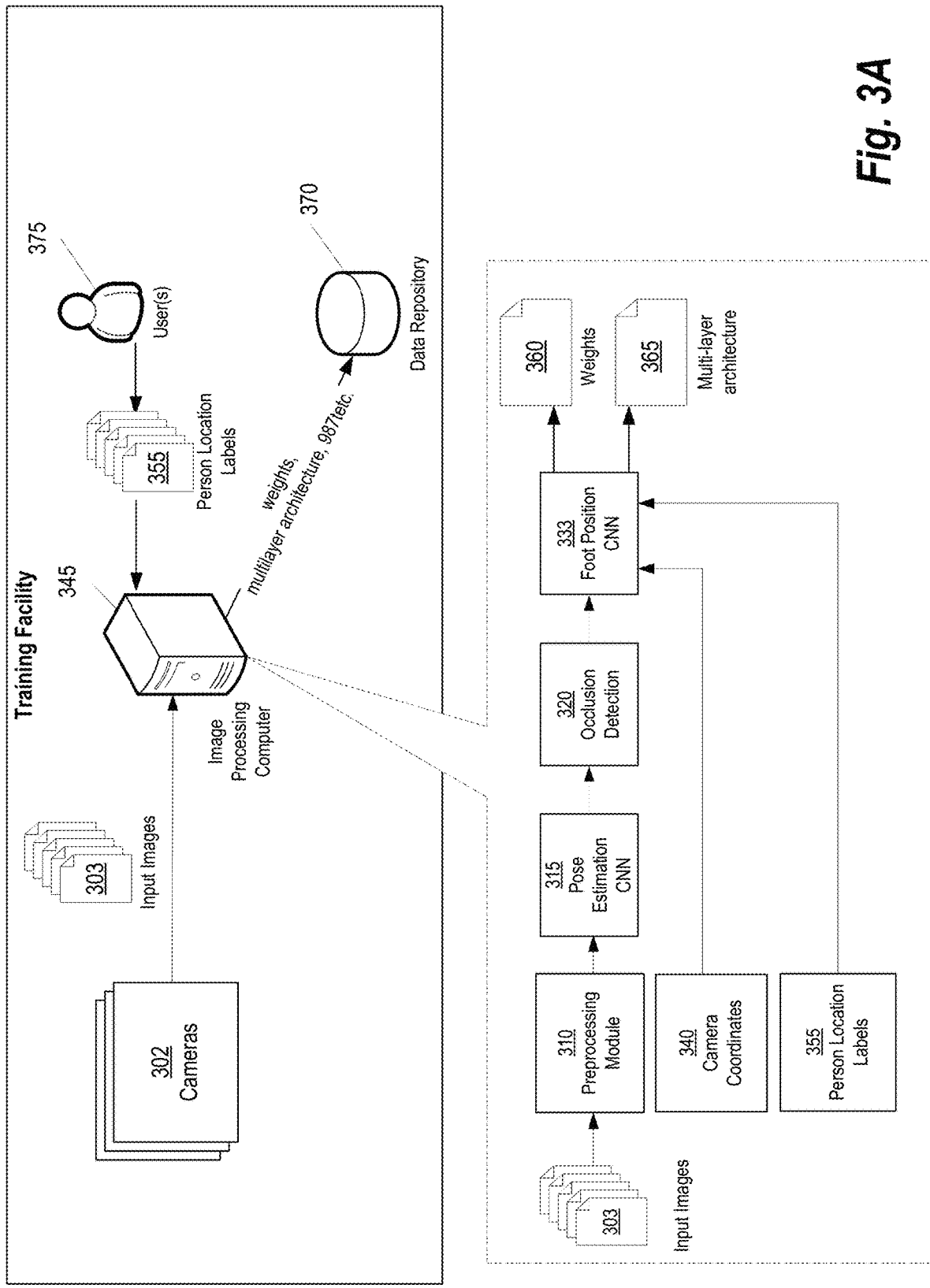
FIG. 3A illustrates an example technique for training the FP CNN, according to some embodiments.

FIG. 3A illustrates an example technique for training a FP CNN, according to some embodiments. Briefly, cameras 302 are used to capture a plurality of input images 303 that are loaded onto an image processing computer 345. The cameras 302 may be, for example, security cameras. Ideally, the images 303 include a variety of images of a person and a floor where the person's feet are partially or fully occluded (e.g., sitting behind a desk, walking in front or behind someone, sitting on a couch with back towards the camera, sitting cross-legged on a couch, etc.).

One or more users 375 view the input images 303 and provide person location labels 355 that describe where the user 375 believes a person is standing, sitting, etc., relative to the floor. Based on the labels, the training process trains the FP CNN 333 and, following training, stores information needed to execute the trained network in a data repository 370 for later use during deployment. The stored information may include, for example, the multi-layer architecture of the FP CNN, the weights that should be applied at different layers, etc.

The bottom portion of FIG. 3A provides more detail on how the FP CNN 333 is trained. In addition to the input images 303 and the person location labels 355, a set of camera coordinates 340 is supplied that describes the position of the cameras 302 in real world space. For example in some embodiments the camera coordinates 340 include latitude and longitude values of the camera, as well as directional information. In some embodiments, this directional information indicates where the camera is pointing (e.g., north, east, south, west, etc.). Additionally, in some embodiments, the directional information also includes spherical coordinates (i.e., declination and degree of rotation relative to world coordinates). In some embodiments, the camera coordinates 340 are provided separate from the input images 303. In other embodiments, the camera coordinates 340 are embedded as metadata into the data files of the input images 303.

A preprocessing module 310 performs any pre-processing necessary to prepare the images for further processing. This pre-processing may include, for example, cropping the input images 303 to a preferred size or to focus on target objects, denoising images, or converting the input images 303 from color to black and white (or vice versa). Following pre-processing, the PE CNN 315 generates a plurality of connected keypoints for each target object in the image. In some embodiments, connected keypoints can be generated as a tensor. First, based on the length (L) and the width (W) of the input images 303, a box of points of L*W*number of pairs of connected keypoints is constructed. For example, with a left wrist and a left elbow, there may be one line representing the connection. Then, for each pair of connected keypoints (25 to 28, depending on PE model), a line is drawn. A line is represented as 1.0 and the absence of a line is represented as 0.0.

Following keypoint generation, an occlusion detection module 320 determines whether target objects are occluded. Occlusion is determined based on whether a particular input includes a requisite number of keypoints for a target object or the keypoints corresponding to the target object's legs, knees, and feet. If the input image does not include any occluded target objects, the input image can be excluded from training. As explained in other sections of this disclosure, the foot position of a non-occluded person can be determined based on the keypoints alone without the use of the CNN. However, if the input images 303 include at least one target object that is occluded, then the input image is provided to the FP CNN 333 as input.

The FP CNN 333 is trained using the input images 303, the camera coordinates 340, and the person location labels 355. As is generally understood in the art, a FP CNN 333 includes an input layer, one or more hidden layers, and an output layer. The hidden layers comprise a plurality of convolutional layers, an activation operation following each convolutional layer, a pooling layer, and a fully connected layer. The activation operation convolves one or more matrices of real values, referred to as "kernels," with the input image to obtain an activation map. The activation map indicates the regions where features specific to the kernel have been detected. The values in the kernels change during each iteration of training as the FP CNN 333 learns to identify which regions are of significance for extracting features from the input images. The use of connected keypoints helps to augment the feature mappings present in the activation map. As is generally understood in the art, feature mappings at the upper levels of deep neural networks are created automatically to discern things like edges, points, and curves, and then, at lower levels as the receptive field gets larger, the network starts picking up things related to its training (e.g., foot position). By putting an augmentation into the input itself, we can jump-start the prediction to make it more accurate and give FP CNN 333 better contextual awareness.

The objective of training the FP CNN 333 is to learn a transfer function between the input layer (features that represent the image) and the output layer (the labels for the image). The image processing computer 345 performs iterative forward and backward passes which are made through the FP CNN 333 as the transfer function is minimized with respect to weights 360 connecting the different layers of the FP CNN 333 architecture. Once the FP CNN 333 has been trained, a description of the multi-layer architecture 365 (i.e., the composition of the different layers) and the weights 360 connecting the neurons from the different layers are stored in a data repository 370 along with description of the labelling system employed during training. The information in the data repository 370 can later be used to deploy the FP CNN 333. For example, in some embodiments, the NVIDIA TensorRT® is used to deploy the FP CNN 333 into a production environment. TensorRT requires 3 files to execute a CNN: a network architecture file, trained weights, and a label file to provide a name for each output class. These 3 files may be generated by the description of the multi-layer architecture 365, weights 360, and the description of the labelling system used for describing foot position, respectively.

Figure 3B:
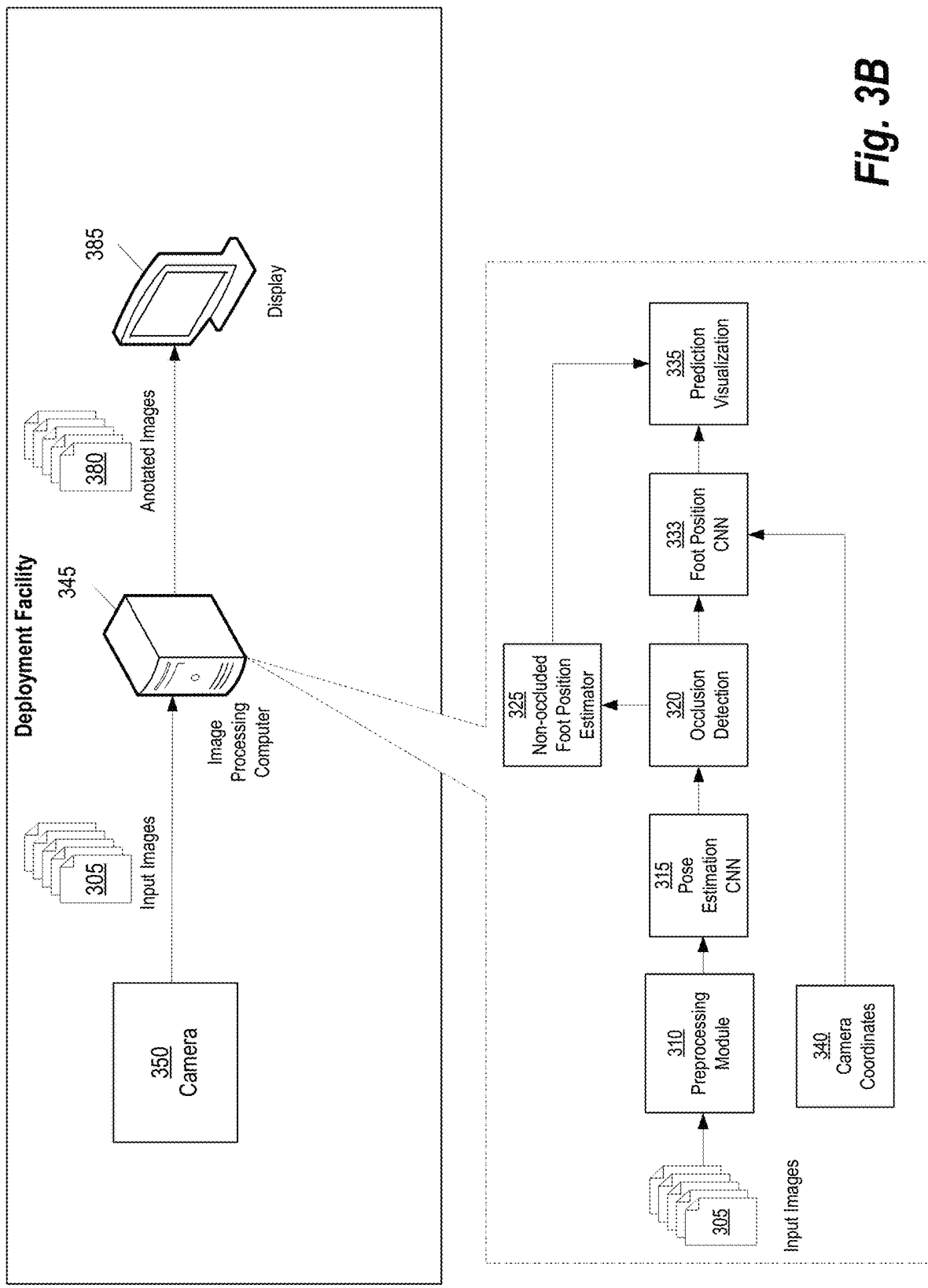
FIG. 3B illustrates an example technique for training the FP CNN, according to some embodiments.

FIG. 3B illustrates an example technique for training the FP CNN, according to some embodiments. Briefly, the camera 350 (e.g., a security camera) collects input images 305 and transfers them to an image processing computer 345. The image processing computer 345 detects the location of target objects in the input images 305, annotates those locations, and displays annotated images 380 on one or more displays 385.

The bottom portion of FIG. 3B shows how the annotated images 380 are created. The input images 305 are preprocessed by the preprocessing module 310, as described above with respect to FIG. 3A. The PE CNN 315 is used to determine keypoints of target objects in the input images 305. Next, the occlusion detection module 320 determines whether the target object's feet are visible (i.e., whether keypoints corresponding to the feet are present). If so, the non-occluded FP estimator 325 predicts the center of the feet to be between the various keypoints given by the PE CNN 315. If the feet are occluded, such as when the person is behind a desk or sitting at a chair, the trained FP CNN 333 is employed using the input images 305 and the coordinates 340 of the camera 350 as input. The output of either the non-occluded FP estimator 325 or the FP CNN 333 is one or more coordinates indicating where a person is relative to the floor in the input images 305. A visualization of these coordinates is generated by the prediction visualization 335 component for display in the annotated images 380.

Figure 4:
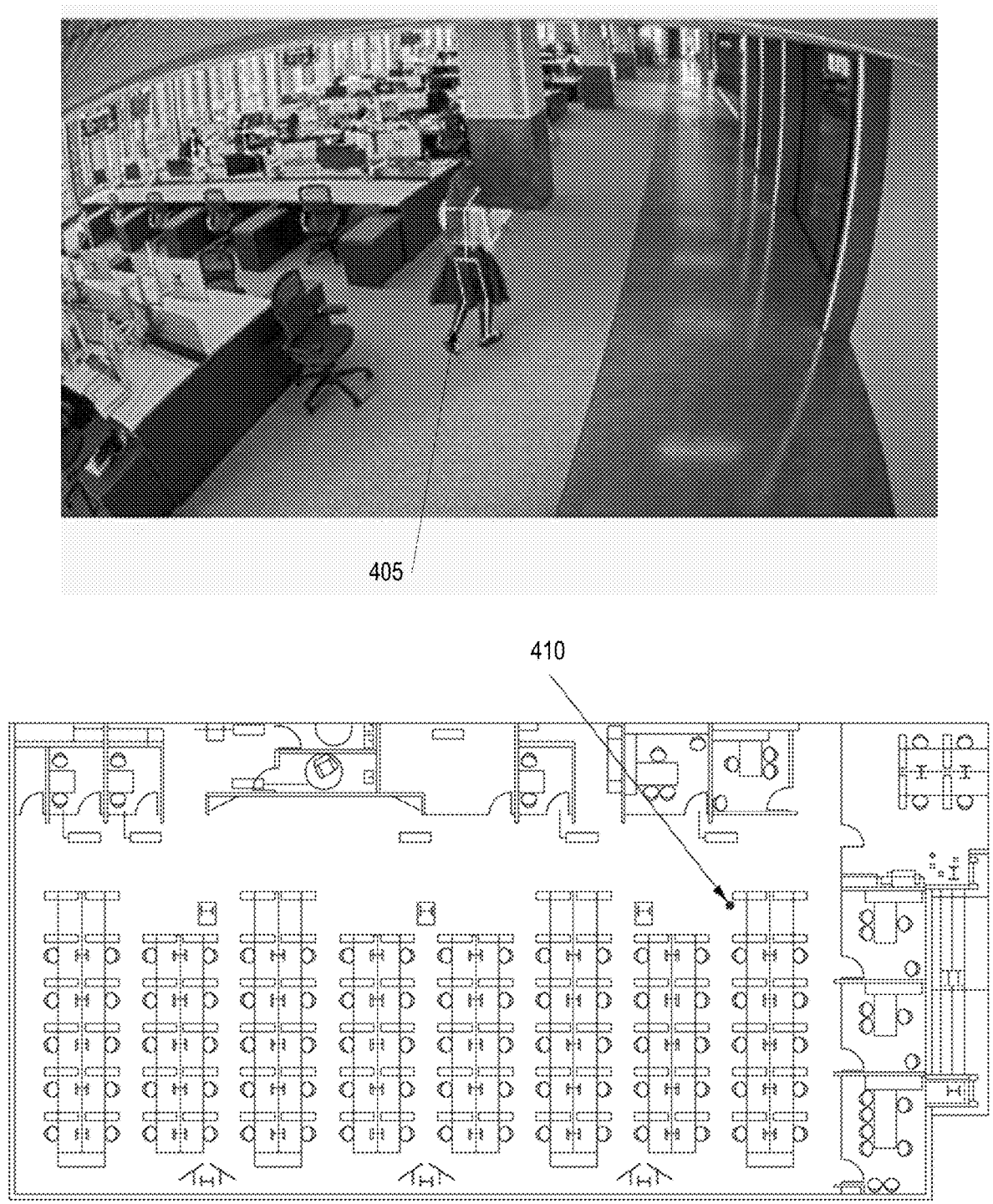
FIG. 4 shows an example visualization that may be used in some embodiments.

Various types of visualizations may be used to depict the person's location on the floor. FIG. 4 shows an example visualization that may be used in some embodiments. The left hand-side depicts a person 405 walking across the floor with keypoints shown, as well as lines connecting the keypoints. The right hand-side of FIG. 4 shows a dot 410 indicating the person's location relative the floor (as depicted on the floor plan).

Figure 5:
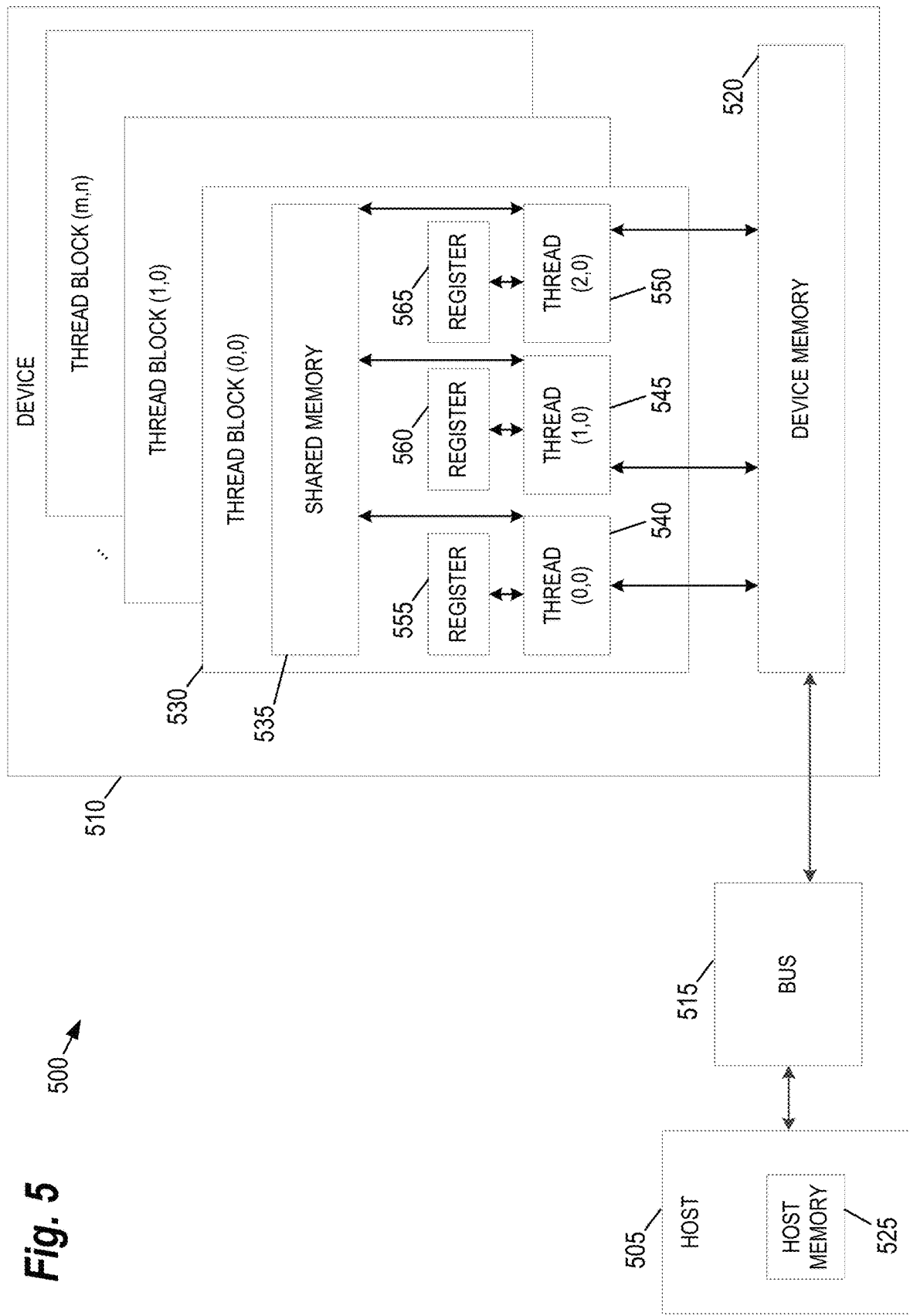
FIG. 5 provides an example of a parallel processing memory architecture that may be utilized by image processing computer, according to some embodiments of the present invention.

FIG. 5 provides an example of a parallel processing memory architecture 500 that may be utilized by an image processing computer, according to some embodiments of the present invention. This architecture 500 may be used in embodiments of the present invention where NVIDIA™ CUDA (or a similar parallel computing platform) is used. The architecture includes a host computing unit ("host") 505 and a GPU device ("device") 510 connected via a bus 515 (e.g., a PCIe bus). The host 505 includes the central processing unit, or "CPU" (not shown in FIG. 5) and host memory 525 accessible to the CPU. The device 510 includes the graphics processing unit (GPU) and its associated memory 520, referred to herein as device memory. The device memory 520 may include various types of memory, each optimized for different memory usages. For example, in some embodiments, the device memory includes global memory, constant memory, and texture memory.

Parallel portions of a CNN may be executed on the architecture 500 as "device kernels" or simply "kernels." A kernel comprises parameterized code configured to perform a particular function. The parallel computing platform is configured to execute these kernels in an optimal manner across the architecture 500 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 500 of FIG. 5 (or similar architectures) may be used to parallelize training of the CNN. For example, in some embodiments, processing of individual images may be performed in parallel.

The device 510 includes one or more thread blocks 530 which represent the computation unit of the device 510. The term thread block refers to a group of threads that can cooperate via shared memory and synchronize their execution to coordinate memory accesses. For example, in FIG. 5, threads 540, 545 and 550 operate in thread block 530 and access shared memory 535. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 5, the thread blocks 530 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the algorithms discussed herein may be partitioned over thread blocks automatically by the parallel computing platform software. However, in other embodiments, the individual thread blocks can be selected and configured to optimize training of the CNN. For example, in one embodiment, each thread block is assigned an individual image or group of related images.

Continuing with reference to FIG. 5, registers 555, 560, and 565 represent the fast memory available to thread block 530. Each register is only accessible by a single thread. Thus, for example, register 555 may only be accessed by thread 540. Conversely, shared memory is allocated per thread block, so all threads in the block have access to the same shared memory. Thus, shared memory 535 is designed to be accessed, in parallel, by each thread 540, 545, and 550 in thread block 530. Threads can access data in shared memory 535 loaded from device memory 520 by other threads within the same thread block (e.g., thread block 530). The device memory 520 is accessed by all blocks of the grid and may be implemented using, for example, Dynamic Random-Access Memory (DRAM).

Each thread can have one or more levels of memory access. For example, in the architecture 500 of FIG. 5, each thread may have three levels of memory access. First, each thread 540, 545, 550, can read and write to its corresponding registers 555, 560, and 565. Registers provide the fastest memory access to threads because there are no synchronization issues and the register is generally located close to a multiprocessor executing the thread. Second, each thread 540, 545, 550 in thread block 530, may read and write data to the shared memory 535 corresponding to that block 530. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 510 to read and/or write to the device memory. Device memory requires the longest time to access because access must be synchronized across the thread blocks operating on the device. Thus, in some embodiments, the processing of each image is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 5, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

As used herein, the term "module" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

What is claimed is:

1. A computer-implemented method for target object position prediction, the method comprising:
   receiving, via a RGB camera a plurality of images depicting one or more persons positioned on a floor;
   assigning one of a plurality of person location labels to each image indicating where the one or more persons are located relative to the floor;
   training a foot position (FP) classifier to classify the images into the person location labels, wherein the FP classifier is configured according to a multi-layer architecture and the training results in determination of a plurality of weights for connecting layers in the multi-layer architecture;
   creating a deployment of the FP classifier based on the multi-layer architecture, the plurality of weights, and the plurality of person location labels.

2. The method of claim 1, wherein the FP classifier is trained using coordinates of the RGB camera.

3. The method of claim 2, wherein the FP classifier is further trained using a plurality of keypoints corresponding to the one or more persons and lines indicating connections between connected keypoints.

4. The method of claim 3, wherein the keypoints are generated by a pose estimation (PE) classifier based on the images.

5. The method of claim 1, further comprising:
   determining a subset of the images where at least one of the persons is not occluded by any other objects in the images,
   wherein the FP classifier is only trained using the subset of images.

6. The method of claim 1, wherein the deployment of the FP classifier comprises one or more files describing (i) the multi-layer architecture, (ii) the plurality of weights, (iii) the plurality of person location labels.

7. The method of claim 1, wherein the FP classifier is a convolutional neural network (CNN).

8. A computer-implemented method for target object position prediction, the method comprising:
   receiving, via an RGB camera, a plurality of images depicting a person positioned on a floor;
   applying a trained pose estimation (PE) model to the images to determine a plurality of keypoints associated with the person;
   determining the person's location relative to the floor by applying a trained foot position (FP) classifier to inputs comprising the keypoints and coordinates specifying a location of the RGB camera; and
   providing a visualization of each person's location relative to the floor.

9. The method of claim 8, further comprising:
   identifying a plurality of connected keypoint pairs,
   for each connected keypoint pair, generating a line, wherein the inputs to the FP classifier comprise the lines generated for the connected keypoint pairs.

10. The method of claim 8, further comprising:
analyzing the plurality of images to confirm that the person is not occluded prior to applying the FP classifier.

11. The method of claim 8, wherein the FP classifier projects a center of gravity of the person downwards onto a plane of the floor to determine the person's location relative to the floor.

12. The method of claim 8, wherein the FP classifier is a convolutional neural network (CNN).

13. The method of claim 12, wherein the PE model is a CNN.

14. The method of claim 8, wherein the visualization comprises an indication of the person on a building floor plan.

15. The method of claim 14, wherein the visualization further comprise a depiction of the keypoints overlaid on the person in the images.

16. A system for target object position prediction, the system comprising:

a pose estimation (PE) model trained to determine a plurality of keypoints associated with a person using images acquired with an RGB camera;

a trained foot position (FP) classifier trained to determine the person's location relative to a floor in the images based on the keypoints and coordinates specifying a location of the RGB camera; and a visualization model configured to provide a visualization of the person's location relative to the floor on one or more displays.

17. The system of claim 16, wherein the trained FP classifier is a convolutional neural network (CNN).

18. The system of claim 16, further comprising:
an occlusion detection module configured to analyze images to confirm that the person is not occluded prior to applying the FP classifier.

19. The system of claim 16, wherein the visualization comprises an indication of the person on a building floor plan.

20. The system of claim 19, wherein the visualization further comprise a depiction of the keypoints overlaid on the person in the images.

* * * * *